(12) United States Patent
Amrany et al.

(10) Patent No.: US 6,412,027 B1
(45) Date of Patent: Jun. 25, 2002

(54) DIRECT MEMORY ACCESS CONTROLLER HAVING ON-BOARD ARBITRATION CIRCUITRY

(75) Inventors: Daniel Amrany, Ocean Township; Ronen Habot, Ocean, both of NJ (US)

(73) Assignee: GlobespanVirata, Inc., Red Bank, NJ (US)

( * ) Notice: Subject to any disclaimer, the term of this patent is extended or adjusted under 35 U.S.C. 154(b) by 0 days.

(21) Appl. No.: 09/243,024

(22) Filed: Feb. 3, 1999

Related U.S. Application Data (60) Provisional application No. 60/074,412, filed on Feb. 11, 1998.

(51) Int. Cl.$^7$ .............................................. G06F 13/28
(52) U.S. Cl. ................................ 710/22; 710/5; 710/29; 710/60
(58) Field of Search ........................ 710/5, 9, 22, 23–28, 710/65, 262, 20, 56, 60, 3, 10, 13, 21.23, 24–27, 29, 62; 711/170, 217

(56) References Cited

U.S. PATENT DOCUMENTS

| | | | |
|---|---|---|---|
| 4,847,750 A | | 7/1989 | Daniel ......................... 364/200 |
| 4,866,597 A | * | 9/1989 | Kinoshita ................... 364/200 |
| 5,001,624 A | | 3/1991 | Hoffman et al. ............ 364/200 |
| 5,212,795 A | | 5/1993 | Hendry ....................... 395/725 |
| 5,325,489 A | * | 6/1994 | Mitsuhira et al. ........... 395/275 |
| 5,398,324 A | * | 3/1995 | Matida et al. ............... 395/425 |
| 5,642,489 A | * | 6/1997 | Bland et al. ................. 710/128 |
| 5,659,798 A | | 8/1997 | Blumrich et al. ........... 395/846 |
| 5,721,949 A | | 2/1998 | Smith et al. ................. 395/825 |
| 5,765,024 A | * | 6/1998 | Riley ........................... 710/22 |
| 5,805,842 A | * | 9/1998 | Nagaraj et al. .............. 710/126 |
| 5,812,875 A | * | 9/1998 | Eneboe ........................ 710/20 |
| 5,875,351 A | * | 2/1999 | Riley ........................... 710/22 |
| 5,878,272 A | * | 3/1999 | Yanagisawa et al. .......... 710/3 |
| 6,012,109 A | * | 1/2000 | Schultz ........................ 710/56 |
| 6,088,517 A | * | 7/2000 | Wanner et al. .............. 710/110 |
| 6,128,673 A | * | 10/2000 | Aronson et al. .............. 710/22 |

* cited by examiner

*Primary Examiner*—Jeffrey Gaffin
*Assistant Examiner*—Rijue Mai
(74) *Attorney, Agent, or Firm*—Thomas, Kayden, Horstemeyer & Risley (57) ABSTRACT

The present invention is directed to an improved direct memory access controller, having built-in arbitration circuitry, whereby multiple, identical, DMA controllers may be cascaded within a computing system, without requiring additional (i.e., separate) arbitration circuitry. In accordance with one aspect of this invention, a DMA controller is provided having a first input for connection to a DMA Acknowledge signal, and a first output for connection to a DMA Request. A second output is also provided for carrying a signal that is representative of activity of the DMA controller. In this regard, the second output may be configured to output a signal in either an Enable state or Inhibit state. If the DMA controller is active (i.e., presently controlling the transfer update among memory devices), then the second output is placed in an Inhibit state. Otherwise, the second output is controlled to be in an Enabled state. In this way, this second output is configured for direct connection to a first input of a second, similar, DMA controller device. Further, the DMA controller includes a sense circuit that is configured to detect a state of the DMA Request signal. Finally, the DMA controller includes a controller circuit that is responsive to both the first input and the sense circuit, and is configured to generate the second output.

25 Claims, 5 Drawing Sheets

DIRECT MEMORY ACCESS CONTROLLER HAVING ON-BOARD ARBITRATION CIRCUITRY

CROSS-REFERENCES TO RELATED APPLICATIONS

The present application claims the benefit of U.S. Provisional Patent Application Serial No. 60/074,412, filed Feb. 11, 1998.

TECHNICAL FIELD

The present invention generally relates to computer systems, and more particularly to an direct memory access (DMA) controllers.

BACKGROUND OF THE INVENTION

As is well known, DMA transfers involve the movement or transfer of data from one memory device to another memory device (within a computing system) across a system bus, and without intervening communication through a processor. More particularly, a processor such as a CPU typically controls and coordinates the execution of instructions within computing system. Ancillary to this operation, the CPU must frequently move data from a memory or other peripheral device into the CPU for processing, or out of the CPU to a memory or other peripheral device after processing. The CPU also often coordinates the movement of data from one memory or peripheral device to another memory or peripheral device.

Figure 1:
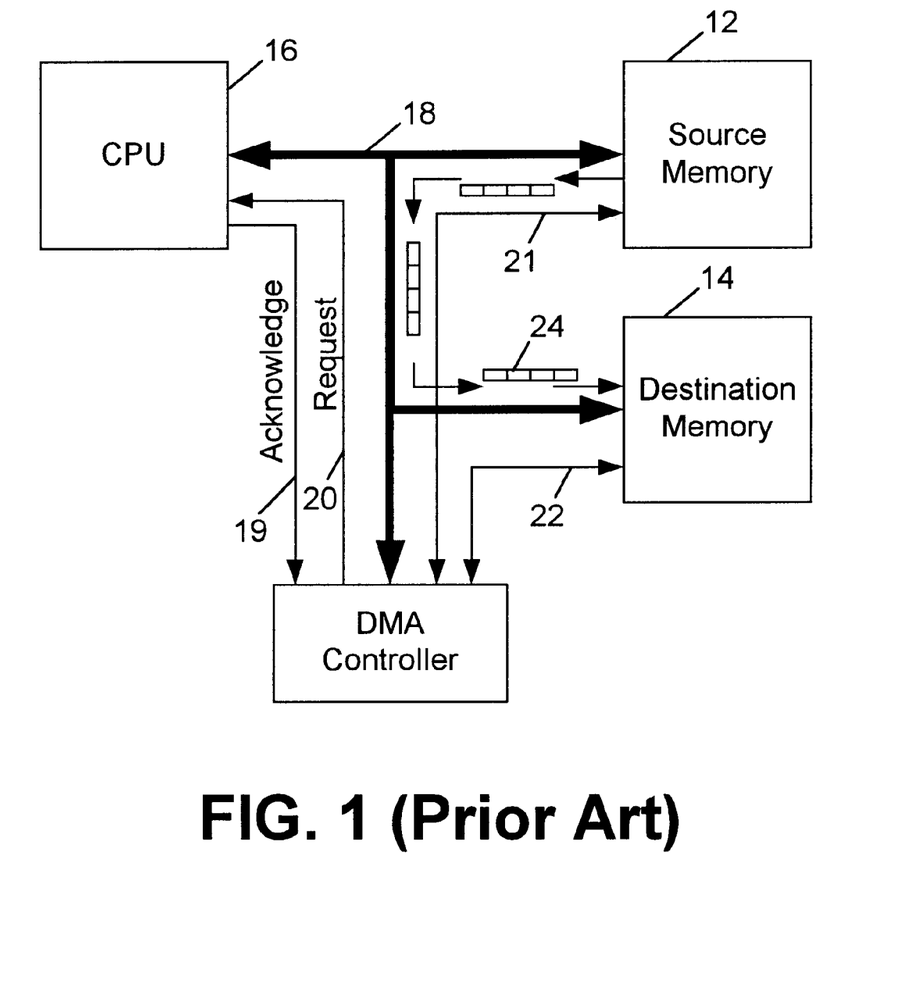
FIG. 1 is a block diagram of a DMA controller in communication with memory and a CPU via a bus.

In very early computing systems, this latter movement of data was accomplished by first reading the data directly from one memory device into the processor, then immediately writing that same data out to another memory device. As computing systems advanced, DMA controllers were created to facilitate such data transfers by controlling the movement of data directly from one memory device to another memory device. FIG. 1 shows a block diagram illustrating certain fundamental components of a computer system that are utilized in connection with such a conventional DMA transfer. In this regard, a single DMA controller 10 is illustrated in connection with a source memory 12, a destination memory 14 and a CPU or some other processing circuit 16. Each of the devices is illustrated as being interconnected, or otherwise disposed for intercommunication, via a bus 18, which preferably comprises both address and data lines. The devices are also interconnected through various control and other signaling lines 19, 20, 21, and 22. In operation, data 24 may be directly transferred between memory devices 12 and 14 across the bus 18, without having to transition through the CPU 16, which allows data to be transferred between the memories at a much higher rate.

As is known, there are three primary steps involved in a DMA transfer. First, the processor 16 sets up the DMA transfer by supplying a DMA controller 10 with the identity of the source and destination memories 12 and 14, the address of the first bit to byte to be transferred from the source memory 12, as well as the number of bytes to be transferred. Once the CPU 16 has communicated this information to the DMA controller 10, the DMA controller 10 starts the operation by either taking control of the bus 18, or otherwise requesting shared control of the bus with other devices (not shown). In this regard, other devices that are disposed along the same bus 18 may share the bus, the allocation of which may be controlled by an arbitration circuit (not shown), as is understood by those skilled in the art. Once the DMA controller 10 has the bus 18, it initiates the bus transfer (assuming that the data is available for transfer). In this regard, and as will be understood by persons skilled in the art, if the data were temporarily stored within a cache memory, or some other device (not shown), then the data actually stored in the memory device 12, would be considered "dirty data", and therefore not subject to transfer. Resolution of nuances such as this are known by those skilled in the art, and need not be discussed herein, in order to effectively illustrate the basic DMA operations as are known by prior art systems.

Utilizing control lines 21 and 22, the DMA controller 10 may orchestrate the transfer of data from the source memory 12 to the destination memory 14. The DMA controller 10 may control the address supplied on address bus 18, as well as the chip select and enable lines necessary in order to read data from a select memory address of the source memory 12 and write that same data to a select memory address in the destination memory 14. Assuming that a plurality of data bytes are to be transferred from the source memory 12 to the destination memory 14, then the DMA control 10 will update the addresses on bus 18 accordingly. Once the DMA transfer is complete, the DMA controller 10 may interrupt the CPU 16 to inform it accordingly. It will be appreciated that throughout the duration of the DMA transfer, the CPU 16 may be performing various processing operations. As is known, this greatly enhances the overall efficiency of the system by allowing the CPU 16 to perform processing tasks, without having to get bogged down in managing simple data transfers between memory devices.

In more complex systems of the prior art, however, more than one DMA controller device may be needed. To illustrate, reference is made to FIG. 2, which is a block diagram illustrating a system similar to the system of FIG. 1, but illustrating additional DMA controllers 30, 32, and 34, along with multiple memory devices 42, 44, 46, and 48. For simplicity, the various control and signaling lines have not been illustrated in FIG. 2. For purposes of illustrating this aspect of the prior art, an arbitration circuit 40 is shown. As is known, when multiple DMA controllers 30, 32, and 34 are provided in a system, then some sort of arbitration circuit 40 is provided to ensure that bus conflicts do not occur.

Figure 2:
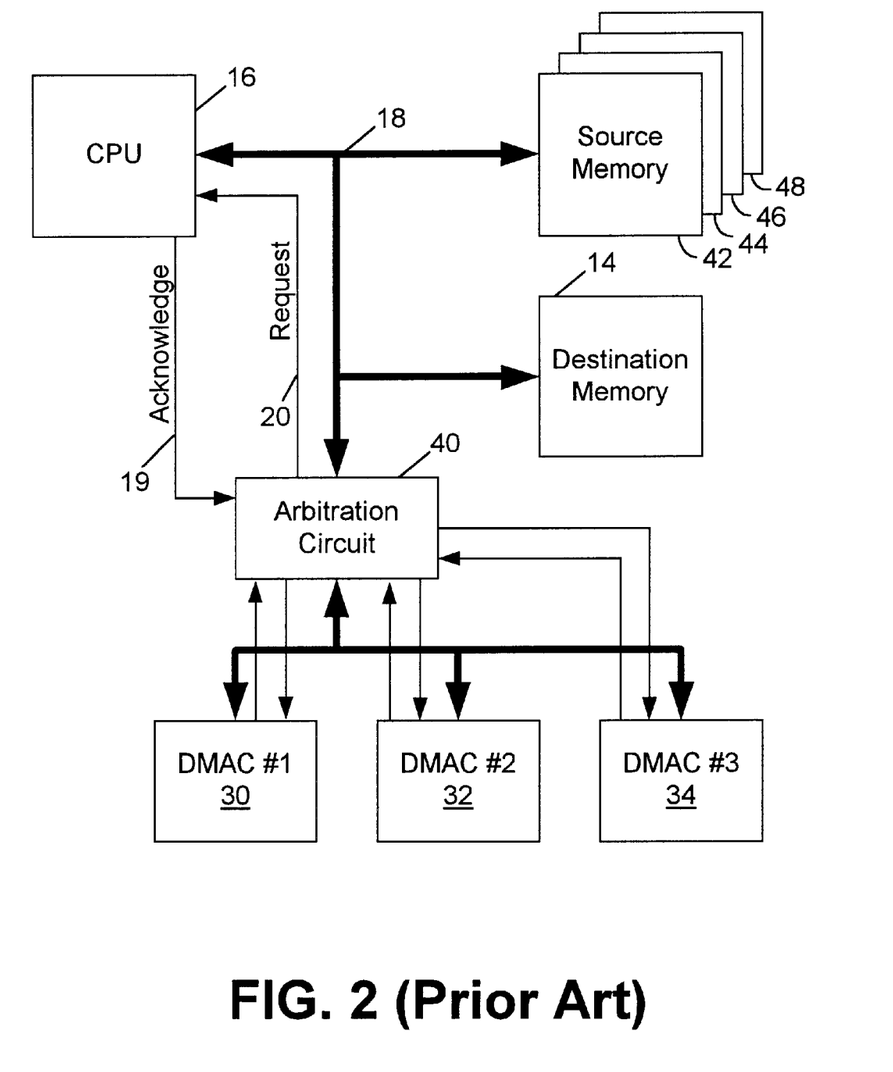
FIG. 2 is a block diagram of multiple DMA controllers in communication with memory, mass storage and a CPU through an arbitration circuit on a common bus.

While the prior art architecture illustrated in FIG. 2 effectively works to allow the operation of multiple DMA controllers 30, 32, and 34 in a system, it nevertheless suffers from the shortcoming of requiring additional arbitration circuitry 40.

There is therefore a need for a system that provides effective DMA management from multiple controllers, while eliminating separate and independent arbitration circuitry.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is directed to an improved direct memory access controller, having built-in arbitration circuitry, whereby multiple, identical, DMA controllers may be cascaded within a computing system, without requiring additional (i.e., separate) arbitration circuitry. In accordance with one aspect of this invention, a DMA controller is provided having a first input for connection to a DMA Acknowledge signal, and a first output for connection to a DMA Request. A second output is also provided for carrying a signal that is representative of activity of the DMA controller. In this regard, the second output may be configured to output a signal in either an Enable state or Inhibit state. If the DMA controller is active (i.e., presently controlling the transfer update among memory devices), then the second output is placed in an Inhibit state. Otherwise, the second output is controlled to be in an Enabled state. In this way, this second output is configured for direct connection to a first input of a second, similar, DMA controller device. Further, the DMA controller includes a sense circuit that is configured to detect a state of the DMA Request signal. Finally, the DMA controller includes a controller circuit that is responsive to both the first input and the sense circuit, and is configured to generate the second output.

It should be appreciated that, when multiple DMA controllers of this type are utilized together, their first output signals may be directly connected to each other, and to the Request signal that is communicated to a processor. This is the signal that requests permission for a given device to initiate or otherwise begin a DMA transfer. Only the first DMA controller, however, has an input that is directly connected to the Acknowledge signal that is provided by the processor. Instead, additional DMA controllers that are utilized directly connect their first input to the second output of a preceding, similar DMA controller. The cooperative operation of the sense circuit and the controller circuit, which generates the second output, ensures that when two or more of the DMA controllers simultaneously Request to perform a transfer, only one will actually seize the bus, and therefore bus contention is avoided, without the addition of a separate and independent arbitration circuit.

Other features and advantages of the present invention will become apparent to one with skill in the art upon examination of the following drawings and detailed description. It is intended that all such additional features and advantages be included herein within the scope of the present invention, as is defined in the claims. dr

BRIEF DESCRIPTION OF THE SEVERAL VIEWS OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims 0.

Figure 3:
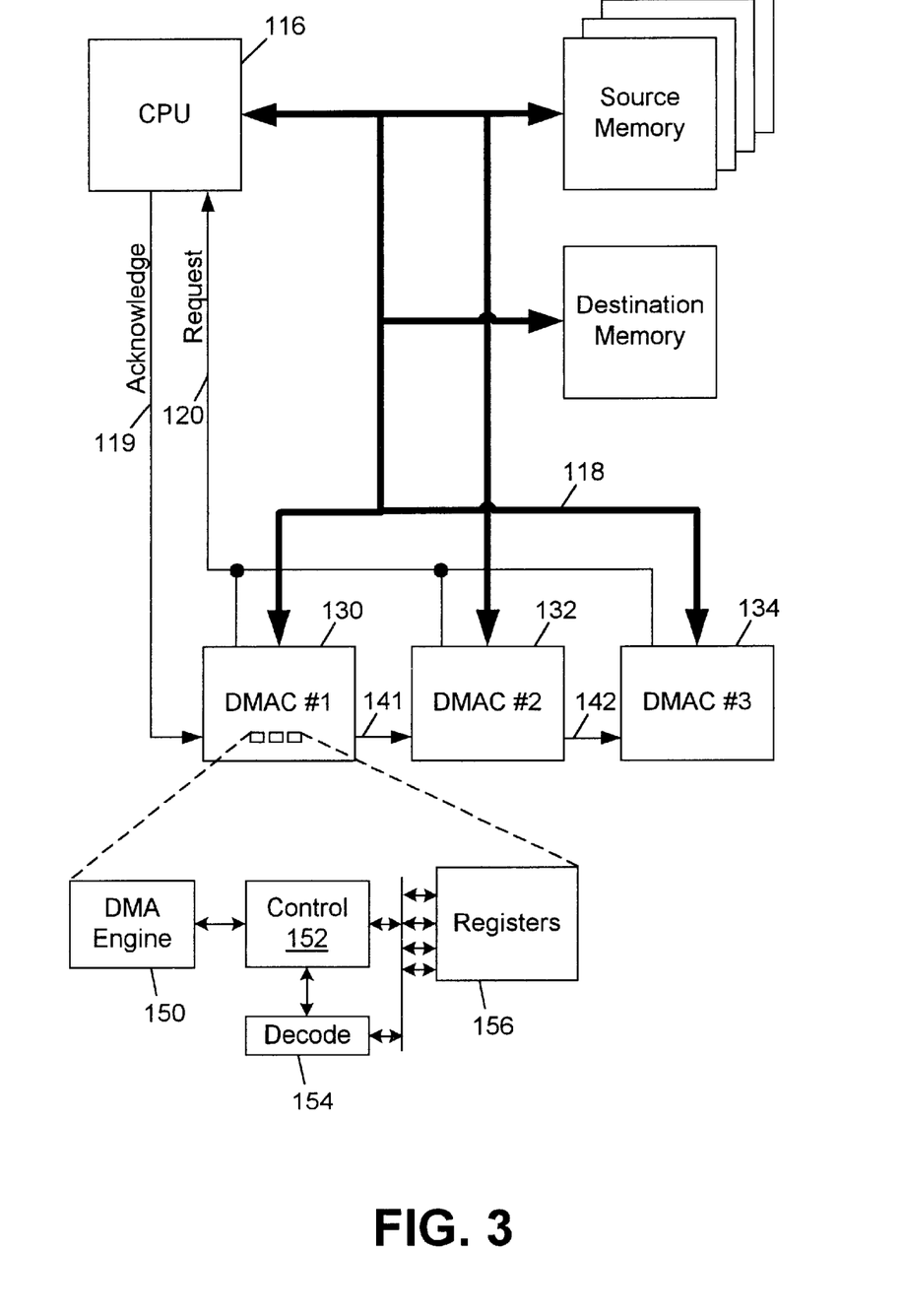
FIG. 3 is a block diagram of the present invention with multiple DMA controllers in communication with memory, mass storage and a CPU across a common bus without the use of a separate arbitration circuit.

Reference is now made to FIG. 3, which is a block diagram illustrating a system having multiple DMA controller devices 130, 132, and 134, constructed in accordance with the present invention. As illustrated, it is readily observed that the diagram of FIG. 3 is similar to the diagram of FIG. 2, except that the arbitration circuit 40 illustrated in FIG. 2, is eliminated from the circuit design by virtue of the present invention, described hereinbelow. For purposes of connectivity, each DMA controller device 130, 132, and 134 has a first input and a first output. The first output signal of each device may be interconnected to the first output of the other devices and connected to a Request signal 120, that signals a request to, for example, a CPU 116. It will be appreciated, however, that in more complex computing systems, this Request signal may be directed to some device other than the CPU 116. The first input signals, however, for each of the DMA controllers 130, 132, and 134 are not interconnected. Instead, and in accordance with the internal arbitration provided by the present invention, only the first input of the first DMA controller 130 is connected to a system Acknowledgment signal 119. Thereafter, the first input for all subsequent DMA controllers 132 and 134 is directly connected to a second output of the preceding DMA controller. Thus, interim signals 141 and 142 are illustrated. Signal 141 interconnects the second output of DMA controller 130 to the first input of DMA controller 132, while signal 142 interconnects the second output of DMA controller 132 to the first input of DMA controller 134.

As will be appreciated by persons skilled in the art, in addition to the internal arbitration circuitry, which will be described below, each DMA controller 130, 132, and 134 has certain fundamental architectures and operational circuitry. Illustrating this circuitry within the first DMA controller 130, the functional circuitry inherent in each of the DMA controllers may be illustrated as comprising a DMA engine 150, DMA control 152, a decoder 154, and a plurality of registers 156. In one embodiment, the DMA engine 150 may be implemented as a state machine, which interfaces with all external signaling. In this regard, the DMA engine 150 interfaces with external circuitry to receive, for example, Acknowledgment signaling and generate, for example, Request signaling. It also both receives and generates the requisite address and data signals for the bus 118. The control portion of the circuitry 152 may also be implemented in a state machine, which interfaces among the DMA engine 150, decode circuitry 154, and internal DMA registers 156. In a preferred embodiment, the registers 156 may include, among others, a configuration register, a command register, a start address register, a data length register, etc. When a processor, or other external circuit device initiates the DMA process, as described above, it instructs the DMA controller as to the length of the block of data to be transferred, as well as the starting address for the transfer. These values may be written into the internal registers 156 of the relevant DMA controller. The decode circuitry 154 may simply be provided for decoding instructions and supplying the relevant information to the control state machine 152.

Having described certain environmental aspects of the present invention, reference will now be made to certain internal arbitration and control circuitry provided within each of the DMA controller devices, constructed in accordance with the present invention. In this regard, reference is made to FIG. 4, which is a block diagram illustrating certain basic components that may comprise the circuitry of a DMA controller 130, constructed in accordance with the invention. It should be appreciated that the block diagram of FIG. 4 does not necessarily represent the actual implementation of the preferred embodiment, but rather provides a functional depiction of the circuitry of the invention. Various alternatives may be provided within the scope and spirit of the invention.

Figure 4:
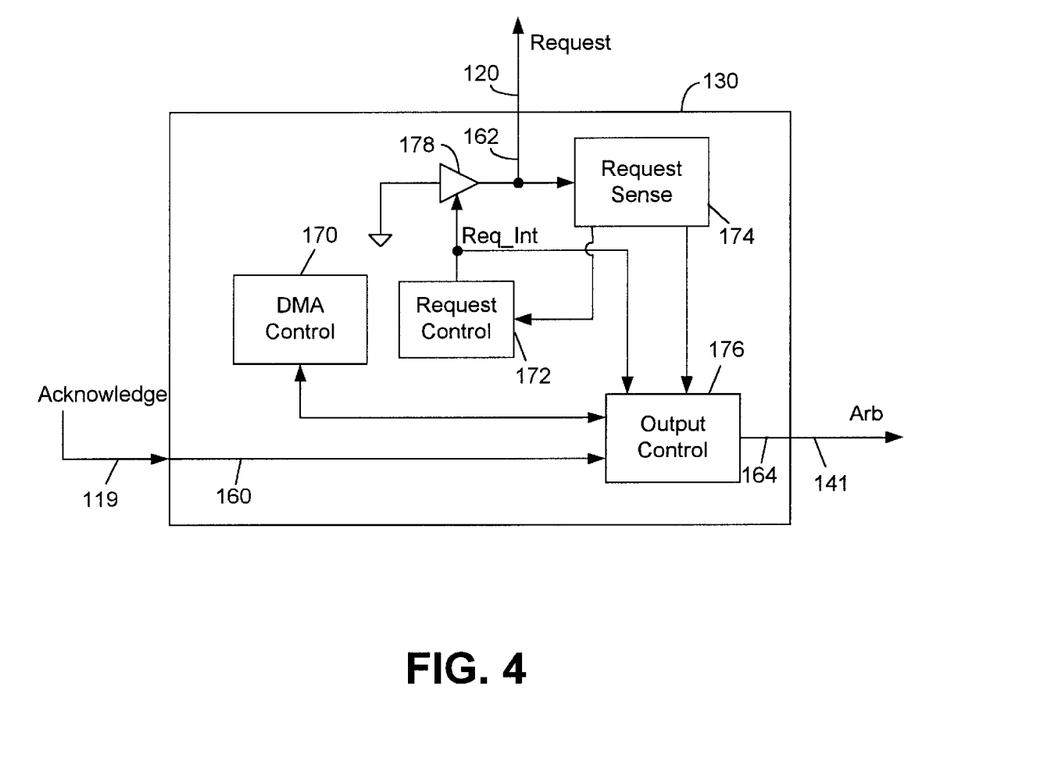
FIG. 4 is a block diagram showing the principal components of a DMA controller constructed in accordance with the present invention.

Within the DMA controller 130, certain fundamental circuit blocks are illustrated, for purposes of illustrating the concepts of the present invention. It will be appreciated, however, that the actual implementation of the DMA controller 130 may differ from that illustrated in the drawing. In this regard, the block diagram of FIG. 4 is provided for purposes of best illustrating the fundamental concepts of the present invention.

More specifically, the DMA controller 130 is realized in a distinct integrated circuit component having one input and two outputs. The input is configured for direct connection to a DMA Acknowledge signal 119, which may be generated by a CPU or other system component. A first output 162 is configured for connection a DMA Request signal 120, which may be directed to a CPU or other system component. Finally, a second output 164 is an arbitration signal 141 (Arb) that is configured for direct connection to a first input 160 of a cascaded DMA controller.

Within the DMA controller 130 itself are several fundamental, functional blocks. These include a DMA control block 170, a Request Control block 172, a Request Sense block 174, and an Output Control block 176. For purposes of illustration, a tri-stateable driver 178 is also shown. The DMA control block 170 is illustrated simply to depict the notion that some overall control of the circuitry is provided. Of course, other blocks (not shown) may be provided within the same integrated circuit device. The fundamental aspects of the present invention, however, are implemented in the remaining blocks 172, 174, and 176. In this respect, the Request Control block 172 is provided for asserting the first output 162 for requesting access to the system bus 118 in order to perform a DMA transfer. Since the first output 162 is configured to be directly connected to the first output 162 of cascaded DMA controller devices, preferably with this output signal is tri-stateable. Accordingly, a tri-stateable driver 178 may be provided, wherein a Req__Int (Request Internal) signal generated by the Request control circuit 172 is utilized to control the driver 178. When the Req__Int signal is de-asserted, the driver 178 is tri-stated, and therefore does not drive the Request signal 120. When, however, the Req__Int signal is asserted, then the driver 178 may be configured to drive the Request signal 120 low, thereby indicating a request for DMA transfer.

A Request Sense circuit block 174 is also illustrated. This circuit receives the Request signal 120 (or the first output 162) as an input. In essence, the function of the Request Sense circuit 174 is simply to indicate whether the Request signal 120 is presently being asserted, or is in high-impedance state (i.e., tri-state). It will be appreciated that the Request Sense circuit 172 not only senses when the Request Control circuit 172 has asserted the Request signal 120, but also if any other cascaded DMA controller has asserted the Request signal 120. It will be further appreciated that the Request Sense circuit 174 may be implemented in a rather simply and straightforward fashion. Indeed, in one implementation the Request Sense circuit 174 may simply be a direct wire connection (i.e., no additional circuitry) from the Request signal line to certain other circuit components within the Request Control circuit 172 and the output control circuit 176.

By way of illustration, the Request Sense circuit 174 is illustrated as generating outputs that are directed to both the Output Control circuit 176 and the Request Control circuit 172. If the Request Sense circuit is implemented as a simple, direct wire connection, then the signal directed to both the Output Control circuit 176 and the Request Control circuit 172 is simply the Request signal 120. Thus, a logic zero would indicate that the Request signal 120 is currently being asserted by a DMA controller (either the present DMA controller or another, cascaded DMA controller). In contrast, a logic one (or a high-impedance state) would indicate that no DMA controller is presently asserting the Request signal 120. In an very similar configuration, the Request Sense circuit 174 may be implemented by a simple inverted or buffer. Alternatively, the Request Sense circuit 174 may be implemented by more complex circuitry, depending upon the particular operation desired.

Yet, consistent with the concepts in teachings of the present invention, additional implementations may be realized for the Request Sense circuit 174. For example, the Request Control circuit 172 may be configured to assert the Req__Int signal only when the Request signal 120 is presently de-asserted (e.g., in either a high-impedance state or a logic one state). The Request Sense circuit 174 may generate an output that is directed to the Request Control circuit 172 that inhibits the generation of the Req_Int signal, when the Request signal 120 is asserted. Thus, in one implementation the Request signal 120, itself, may be utilized as a direct input to the Request Control circuit 172 (i.e., the Request Sense circuit 174 may be implemented as a short circuit). Alternatively, due to fan-out (e.g., so that the Request signal 120 drives only one gate input per DMA controller) or other reasons, the Request Sense circuit may be implemented as an inverter, buffer, or other relatively simply circuit component.

The output control circuit 176 also utilizes an output of the Request Sense circuit 174 in generating the second output 164. In this regard, the output control circuit 176 also utilizes the Req_Int signal in the generation of the second output 164. Specifically, the output control circuit 176 utilizes the first input 162, the Req_Int signal generated by the Request Control circuit 172, and an output of the Request Sense circuit 174. In short, and as will be further described in connection with FIG. 5, the output control circuit 176 generates the second output 164 to be in one of two states: an Enable state, and an Inhibit state. In accordance with a preferred embodiment of the invention, the output control circuit 176 will generally generate the second output 164 to be in the Enable state, which is characterized by essentially the passing through of the first input 160. That is, when the second output 164 is Enabled, then the Acknowledge signal applied to the first input 160 may be passed through to cascaded DMA control devices. When inhibited, the second output 164 blocks the passing through of the first input 160.

Figure 5:
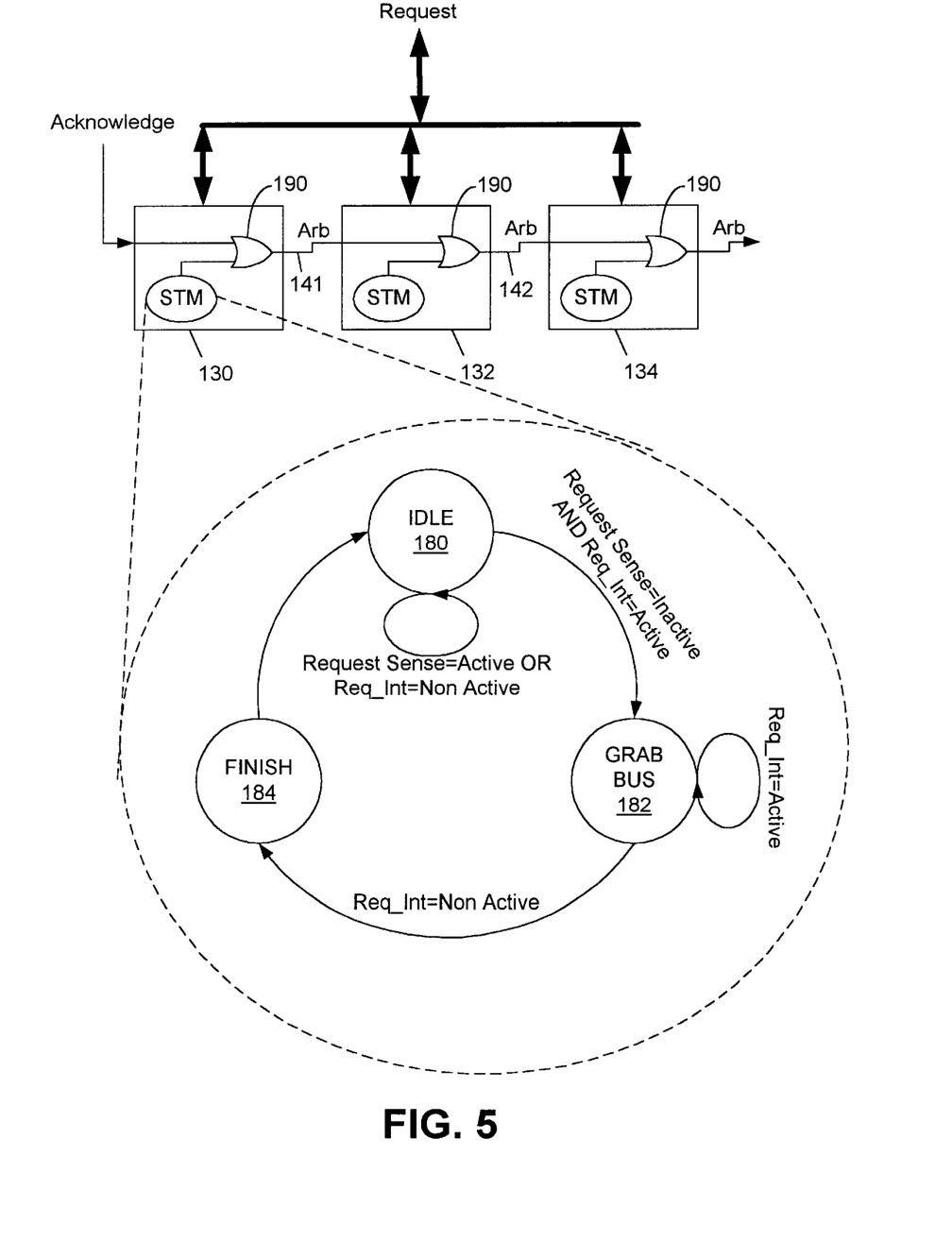
FIG. 5 is a block diagram showing multiple DMA controllers of the present invention, which include state machines, in communication across a common bus.

To better illustrate the operation of the present invention in connection with multiple, cascaded DMA controllers, reference is now made to FIG. 5. It is noted that, although not specifically illustrated in FIG. 5, each of the DMA controllers 130, 132, and 134 includes the internal circuitry illustrated in connection with the DMA controller 130 depicted in FIG. 4. To illustrate, assume that both the Request signal 120 and the Acknowledge signal 119 are active low signals. Further assume that multiple DMA control devices 130, 132, 134 are cascaded by directly interconnecting their first outputs 162. The first input 160 of the first DMA controller 130 may be directly connected to the Acknowledge signal 119, while the first inputs 160 of subsequent DMA controllers are connected to the second outputs 164 of the preceding DMA controller. Since, when not active, the first output of the individual DMA controllers are placed in a high impedance state, the Request signal 120 may be tied to a pull-up resistor (not shown), which places the signal in a logic one state, unless it is driven low by any of the DMA controllers 130, 132, or 134. During normal operation, each DMA controller is configured to enable the second output 164, whereby the first input 160 simply passes through each of the DMA control devices. For example, if the third DMA controller 134 asserts its first output (i.e., Request signal 120), then once the processor acknowledges this request by driving the Acknowledge signal 119 low, this signal is simply passed through DMA controllers 130 and 132, until it is received by DMA controller 134. Upon receiving this Acknowledge signal, DMA controller 134 may then begin its DMA transfer, in a way that is customary and known in the art.

Further assume that during these DMA transactions, the second DMA controller 132 wished to initiate a DMA transaction, the Request Sense circuit of DMA controller 132 would sense that the Request signal 120 is low, indicating that another device is in the midst of a DMA transaction. This activity detection would be promulgated to the Request Control circuit of the DMA controller 132, which would inhibit the generation of its Req_Int signal (until the Request signal 120 is deasserted), and thereby avoid bus contention.

The example presented above assumed, for purposes of illustration, that the Request and Acknowledge signals are active low signals. However, consistent with the broader concepts and teachings of the invention, the signals may be active high signals. Indeed, the preferred embodiment of the present invention includes programmable circuitry (not shown) that may programmably configure the device to operate with the Request and Acknowledge signals as being either active high or active low.

It will be appreciated from the foregoing discussion, that bus contention may nevertheless arise if two or more of the cascaded DMA controllers were to simultaneously initiate a request for a DMA transaction. That is, if, at the same time or approximately the same time, two or more individual DMA controllers wish to initiate a DMA transaction, the Request Sense circuitry of each of the controllers may sense that the Request signal 120 is in a de-asserted (i.e., logic one or high impedance) state. Therefore, the Request Control circuitry of each such DMA controller may simultaneously initiate its Req_Int signal, causing each controller to assert the Request signal 120 at substantially the same time. When this occurs, both DMA controllers, for example DMA controllers 132 and 134, will operate by inhibiting each of their second outputs 164. Specifically, the Req_Int signal may be directed to the output control circuitry of each DMA controller, and prevent the passing through of the first input 160. The processor or other system device that receives the Request signal 120 does not realize (nor does it need to realize) that multiple DMA controllers are placing a simultaneous request for a DMA transfer. Instead, its simply receives the Request signal 120 and generates an Acknowledge 119 when the bus is available for DMA transfer.

If the two DMA controllers requesting the transfer are controllers 132 and 134, the Acknowledge signal will first be delivered to DMA controller 130. Assuming that DMA controller 130 has not initiated a request for a DMA transfer, then the Acknowledge will simply be passed through DMA controller 130 to its second output 164 (e.g., Arb signal 141). DMA controller 132 will receive this Acknowledge signal 119 and recognize that it can immediately initiate its DMA transfers. Due to the operation of the output control circuitry of DMA controller 132, however, the Acknowledge signal 119 will not be passed through to DMA controller 134.

Therefore, DMA controller 134 does not receive the Acknowledge signal, and therefore does not attempt to begin its DMA transfer. It may, however, continue to assert the Request signal 120. Once the DMA controller 132 has completed its DMA transfer, it de-asserts its first output 162. If DMA controller 134 continues to assert its first output 120 (i.e., the Request signal 120), the processor assumes that the DMA transfers are continuing and it will continue to assert the DMA Acknowledge signal. Once DMA controller 132 completes its DMA transfers, its Output Circuit will again permit the passing through of the Acknowledge signal 119, which will then reach DMA controller 134, which may begin its DMA transfers at that time.

It will be appreciated that, if DMA controller 130 wished to initiate a DMA transaction, after DMA controllers 132 and 134 had asserted the Request signal 120, the Request Sense circuit 174 of DMA controller 130 would prevent the Request Control circuit 172 of DMA controller 130 from asserting its Req_Int signal. In this way, DMA control devices down the line do not become "starved" due to repeated or multiple DMA requests and transactions of devices that precede them.

In keeping with the description of FIG. 5, a state diagram is shown illustrating the principal operation of a DMA controller constructed in accordance with the present invention. In general, such a state diagram may be represented by three states, and Idle state 180, a Grab Bus state 182 and a Finish state 184. Upon power up reset, the DMA controller may proceed to an Idle state 180. So long as the Request Sense circuit of that DMA controller indicates that the Request signal is active or asserted (by another DMA controller), then the DMA controller remains in the Idle state 180. In addition, the DMA controller will remain in its Idle state (notwithstanding the state of the Request Sense circuit) if its internal Req_Int signal is not asserted. Under this condition, another device may be asserting the Request signal 120, but if the present DMA controller is not initiating the request for a DMA transaction, then it will remain in its Idle state 180. When both of these conditions become false, however, then the DMA controller will transition to the Grab Bus state 182. In this regard, if the Request Sense circuit indicates that the Request signal 120 is not active, and the present DMA controller is placing a request by asserting its Req_Int signal, for a DMA transaction, then DMA controller will proceed to state 182 where it will seize control of the bus. In this state, the DMA controller will inhibit the pass through of its first input. Also in this state, it will wait until it receives the Acknowledge signal that is input to the DMA controller, after which it will carry out its various DMA transactions. Once the DMA transactions are complete, the DMA controller will de-assert its Req_Int signal, thereby transitioning to a Finish state 184. In this state, the DMA controller will de-assert its first output 162 and again initiate the pass through of its first input 160.

As illustrated schematically, the inhibit feature of each DMA controller may be implemented utilizing a simple OR gate 190. As illustrated in FIG. 5, the Acknowledge signal that is input to each DMA controller may be "passed through" to the Arb output by passing it through an OR gate 190, where the OR gate 190 may be controlled by an output of the state machine. In either the Idle state 180 or the Finish state 184, the state machine may output a one to the OR gate 190, thereby allowing the OR gate 190 to pass the Acknowledge signal through. In state 182, however, the DMA controller may inhibit the pass through the Acknowledge signal by placing a logic zero to its control input of the OR gate 190.

It will be appreciated that the OR gate 190 illustrated in FIG. 5 would be implemented for active low Request and Acknowledge signals, and that an AND gate may be implemented in place of the OR gate 190 for active high Request and Acknowledge signals. In this regard, the OR gate does not represent an actual implementation, but rather merely illustrates the functional operation of one embodiment of the invention.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A first direct memory access (DMA) controller comprising:
   a first input for connection to a DMA Acknowledge signal;
   a first output for connection to a DMA Request signal;
   a second output for carrying a signal that is representative of activity of the DMA controller, the second output being configured for direct connection to a first input of a second DMA controller;
   a sense circuit configured to detect a state of the DMA Request signal; and
   a controller circuit responsive to both the first input and the sense circuit configured to generate the second output.

2. The DMA controller as defined in 1, wherein the second DMA controller is identical to the first DMA controller.

3. The DMA controller as defined in 1, wherein the controller circuit includes an input that is directly connected to the first input.

4. The DMA controller as defined in 1, further including a second control circuit configured to control the first output.

5. The DMA controller as defined in 4, wherein the second control circuit is configured to generate an output signal that controls the first output signal.

6. The DMA controller as defined in 4, wherein the second control circuit is responsive to the sense circuit.

7. The DMA controller as defined in 1, wherein the controller circuit is responsive to the sense circuit.

8. The DMA controller as defined in 1, wherein the DMA controller is configurable to operate utilizing active low Request and Acknowledge signals.

9. The DMA controller as defined in 1, wherein the DMA controller is configurable to operate utilizing active high Request and Acknowledge signals.

10. A first direct memory access (DMA) controller comprising:
    a first input for connection to a DMA Acknowledge signal;
    a first output for connection to a DMA Request signal;
    a second output for carrying a signal that is representative of activity of the DMA controller, the second output being configured for direct connection to a first input of a second DMA controller;

sensing means for sensing a state of the DMA Request signal; and means responsive to both the first input and the sense means for generating the second output.

11. A first direct memory access (DMA) controller in the form of an integrated circuit comprising:

an input for connection to a DMA Acknowledgement signal;

a first output for connection to a DMA Request signal;

a second output for connection to the input of a second DMA controller;

a first circuit configured to control the first output;

a second circuit configured to sense the state of the Request signal; and a third circuit configured to control the second output between an inhibited state and an enabled state, wherein the third circuit places the second output in the enabled state when the second circuit senses the state of the Request signal as indicating that there is no pending request for a DMA transfer, and the first input indicates that the Request signal has been Acknowledged.

12. The DMA controller as defined in 1, wherein the first circuit includes an input that is directly connected to the first input.

13. The DMA controller as defined in 1, further including a third circuit configured to control the first output.

14. The DMA controller as defined in 4, wherein the third circuit is configured to generate an output signal that controls the first signal.

15. The DMA controller as defined in 4, wherein the third circuit is responsive to the sense circuit.

16. The DMA controller as defined in 1, wherein the first circuit is responsive to the sense circuit.

17. A first arbitration controller comprising:

a first input for connection to an Acknowledge signal;

a first output for connection to a Request signal;

a second output for carrying a signal that is representative of activity of the first arbitration controller, the second output being configured for direct connection to a first input of a second arbitration controller;

a sense circuit configured to detect a state of the DMA Request signal; and a controller circuit responsive to both the first input and the sense circuit configured to generate the second output.

18. The arbitration controller as defined in 17, wherein the second arbitration controller is identical to the first arbitration controller.

19. The arbitration controller as defined in 17, wherein the controller circuit includes an input that is directly connected to the first input.

20. The arbitration controller as defined in 17, further including a second control circuit configured to control the first output.

21. The arbitration controller as defined in 20, wherein the second control circuit is configured to generate an output signal that controls the first output signal.

22. The arbitration controller as defined in 20, wherein the second control circuit is responsive to the sense circuit.

23. The arbitration controller as defined in 17, wherein the controller circuit is responsive to the sense circuit.

24. The arbitration controller as defined in 17, wherein the arbitration controller is configurable to operate utilizing active low Request and Acknowledge signals.

25. The arbitration controller as defined in 17, wherein the arbitration controller is configurable to operate utilizing active high Request and Acknowledge signals.

* * * * *